(No Model.)
F. ERREN & O. LOHNER.
DOUGH KNEADER.
No. 478,507. Patented July 5, 1892.
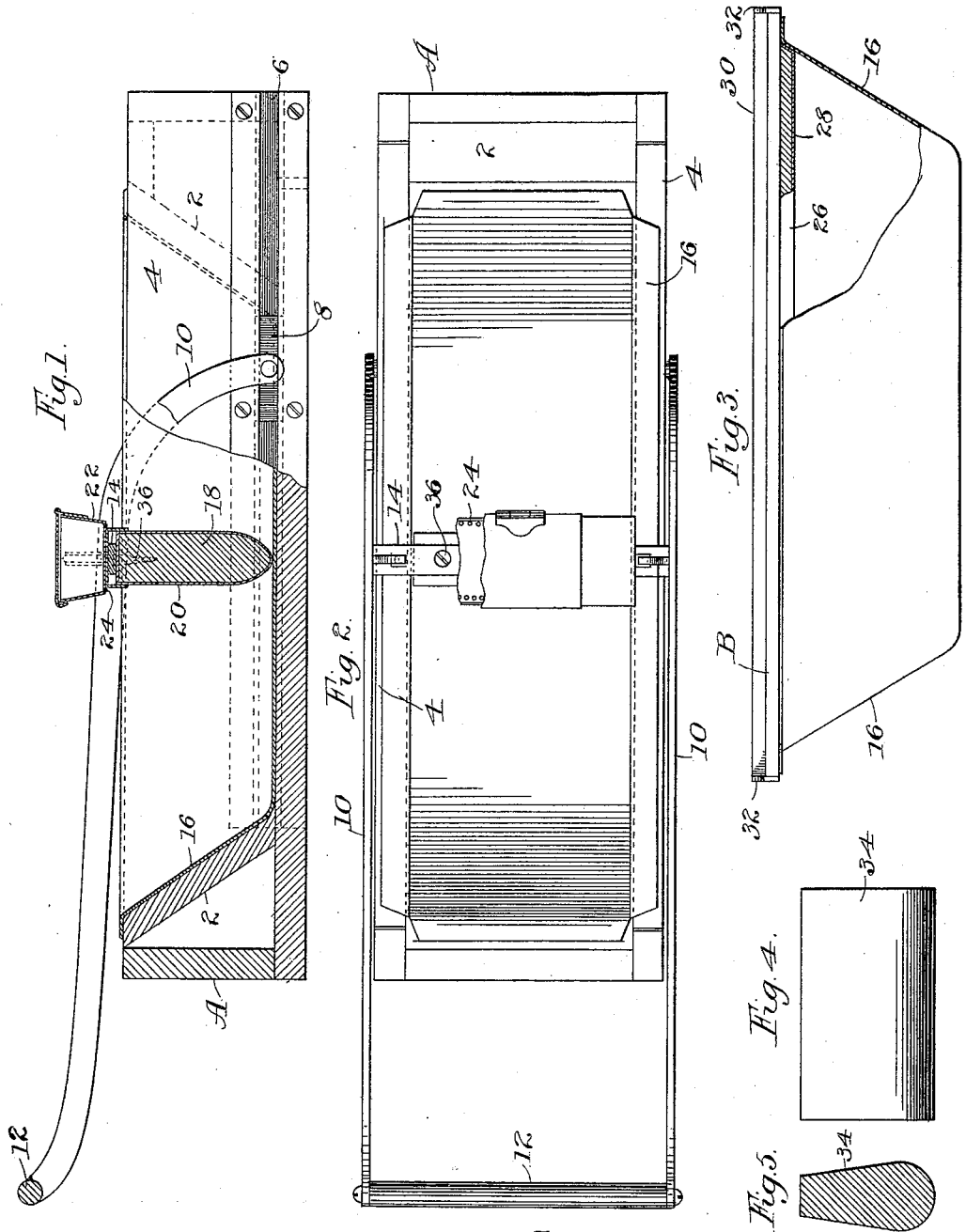
Witnesses:
C. R. Caldwell
H. S. Johnson
Inventors:
Frank Erren,
Otto Lohner,
per Paul Munwin
Attorneys

UNITED STATES PATENT OFFICE.

FRANK ERREN AND OTTO LOHNER, OF ST. PAUL, MINNESOTA.

DOUGH-KNEADER.

SPECIFICATION forming part of Letters Patent No. 478,507, dated July 5, 1892.

Application filed March 7, 1892. Serial No. 423,963. (No model.)

*To all whom it may concern:*

Be it known that we, FRANK ERREN and OTTO LOHNER, of St. Paul, Ramsey county, Minnesota, have invented a certain new and Improved Dough-Kneader, of which the following is a specification.

The object of our invention is to provide an apparatus for the convenient kneading of bread-dough, which may also be provided with attachments to transform it into a butter-worker.

To this end our invention consists in providing a rectangular box or receptacle with inner sloping ends, having grooves or guides arranged upon its sides, with which engage the ends of two arms connected at their other ends by a cross-bar or handle. Intermediate of the ends another cross-bar connects the arms above the box, to which is connected a block having a rounded or convex lower edge and extending downward into the box and transverse of the same. By means of the handle this block can be raised and lowered in the box and carried along lengthwise of the same by sliding the arms along the guides.

In order to adapt the apparatus for use as a bread-dough kneader, a removable metallic lining or tray is fitted to the box, and the block is removed and another substituted having a metallic covering, so that the dough is in contact only with metallic surfaces. We also arrange upon the top of this block a flour-receptacle having a perforated bottom, by means of which flour may be sprinkled upon the dough in the process of kneading. This inner tray or lining when removed from the box forms a convenient receptacle for the "setting" of the bread-dough. It may also be provided with a suitable cover to serve as a kneading-board.

Our invention further consists in the specific construction hereinafter described, and particularly pointed out in the claims.

In the drawings forming part of this specification, Figure 1 is a sectional side elevation of our improved apparatus shown arranged as a bread-kneader. Fig. 2 is a plan view of the same, part of the flour-receptacle being broken away. Fig. 3 is a sectional side elevation of the metallic lining or tray shown removed from the box, and Figs. 4 and 5 are details of the butter-worker block.

In the drawings, A represents a rectangular box, inside of which, at each end, is arranged a sloping block 2. Near the bottom of each side 4 is arranged a longitudinal guide or dovetail groove 6, in which is arranged the slidable block 8, pivotally attached to the arms 10. These arms are connected at their ends by means of the cross-bar 12, which serves as a handle, and also by the intermediate cross-bar 14. Into the receptacle or box A is fitted the removable sheet-metal tray 16, its edges overlapping the edges of the box. To the cross-bar 14 is removably secured the block 18, which is fitted transversely of the tray 16 and has its lower edge rounded or convex and has a sheet-metal covering 20, as shown in Fig. 1. Upon the top of the block 18 is arranged a flour-receptacle 22, somewhat wider than the thickness of the block, having perforations 24 through the projecting edges of its bottom to permit the flour held in the receptacle to sift through into the tray. When the tray is removed from the box, it may be covered by means of the cover B, which has a projection 26 on its under side, lined with the sheet metal 28, and adapted to fit into the top of the tray, as shown in Fig. 3. The cover B is preferably provided with a flange 30 on its back edge and the flanges 32 at the ends, by means of which construction it is convenient for use as a kneading-board when so desired.

In Figs. 4 and 5 is shown a wooden block 34 intended to be substituted for the block 18 when the apparatus is to be used as a butter-worker. This block 34 has a similar convex lower edge, but of greater diameter, so as to give a broader bearing or working surface.

Operation: When it is desired to use the apparatus for the kneading of bread-dough, the tray 16 is placed in the box, the block 18 secured to the cross-bar 14 by means of the screws 36, and the flour-receptacle 22 secured in place, as shown in Figs. 1 and 2. The dough being placed in the tray and a suitable amount of flour in the receptacle 22, the handle 12 is operated so as to work the dough, as may be required, from end to end of the tray, the arms sliding along the guides. When it is desired to use the apparatus for a butter-worker, the tray 16 is removed and the block 34 substituted for the block 18, the operation of working the butter being carried out in the same manner as the kneading of the bread-dough.

We claim—

1. The combination, with the rectangular box provided with longitudinal guides, of the arms engaging said guides and provided with a suitable handle, the removable sheet-metal tray fitted to said box, the block carried by said arms and fitted transversely in said tray, and the flour-receptacle arranged on the top of said box, substantially as described.

2. The combination, with the rectangular box provided with longitudinal guides, of the arms pivotally and slidably connected to said guides and provided with a suitable handle, the convex sheet-metal block carried by said arms and standing transversely in said box, the perforated flour-receptacle carried by said arms, the removable sheet-metal tray arranged in said box, and the removable flanged cover for said tray, substantially as described.

3. The combination, with a rectangular box provided with longitudinal guides, of the handle pivotally and slidably connected to said guides, the convex metallic block fixed to said handle and fitting transversely in said box, and the perforated flour-receptacle carried by said handle above said box, substantially as described.

In testimony whereof we have hereunto set our hands this 29th day of February, 1892.

FRANK ERREN.
OTTO LOHNER.

In presence of—
T. D. MERWIN,
H. S. JOHNSON.